United States Patent
Suzuki (10) Patent No.: US 6,429,404 B1
(45) Date of Patent: Aug. 6, 2002

(54) METHOD AND APPARATUS FOR DETERMINING SEAM TRACKING CONTROL OF ARC WELDING

(75) Inventor: Yukimitsu Suzuki, Anjo (JP)

(73) Assignee: Central Motor Wheel Co., Ltd., Aichi-Ken (JP)

(*) Notice: Subject to any disclaimer, the term of this patent is extended or adjusted under 35 U.S.C. 154(b) by 0 days.

(21) Appl. No.: 09/625,668

(22) Filed: Jul. 26, 2000

(30) Foreign Application Priority Data

Aug. 17, 1999 (JP) .......................................... 11-230881

(51) Int. Cl.[7] .............................................. B23K 9/127
(52) U.S. Cl. .............................. 219/124.34; 219/125.12
(58) Field of Search ....................... 219/125.12, 124.34

(56) References Cited

U.S. PATENT DOCUMENTS

| | | | | |
|---|---|---|---|---|
| 4,151,395 A | * | 4/1979 | Kushner et al. ....... | 219/124.34 |
| 4,857,700 A | * | 8/1989 | Toyoda et al. ......... | 219/124.34 |
| 4,920,248 A | * | 4/1990 | Toyoda et al. ......... | 219/124.34 |
| 5,130,514 A | * | 7/1992 | Kugai et al. .......... | 219/124.34 |

* cited by examiner

Primary Examiner—Clifford C. Shaw
(74) Attorney, Agent, or Firm—J.C. Patents (57) ABSTRACT

A tracking monitoring device and a tracking control device are provided for determining the state of how a weld line is tracked under arc sensing control to let the oscillating center of a welding torch track a correct weld line along the groove center based on a welding current waveform when the welding torch is oscillated in the direction of the groove width, and for controlling an arc welding process. The tracking monitoring device and the tracking control device can form a weld line less affected by a short-circuit mode or sputtering mode which serves as a disturbance factor in a welding current value and are capable of coping with a welding speed increase in association with higher speed oscillating frequency.

11 Claims, 6 Drawing Sheets

METHOD AND APPARATUS FOR DETERMINING SEAM TRACKING CONTROL OF ARC WELDING

BACKGROUND OF THE INVENTION

1. Field of the Invention

The present invention relates to a tracking monitoring device for determining the state of how a weld line is tracked under arc sensing control to let the oscillating center of a welding torch track a correct weld line along the groove center based on a welding current waveform when the welding torch is oscillated in the direction of the groove width, and a tracking control device using the monitoring technique.

2. Detailed Description of the Related Art

In recent arc welding systems, as the output control of the welding power supply has been shifted from the thyristor type to the inverter type, so that the control speed has been increased from 300 Hz to 15–60 kHz, thereby to be 50–200 times faster than the prior apparatuses. Moreover, the waveforms control of the welding current and welding voltage can be made. Thus, the arc starting property and the welding stability during a high speed arc welding may be improved, while the amount of spatters produced can be reduced, so that the welding stability during an arc welding has been also improved.

Meanwhile, as a method of controlling a welding torch to track a weld line, an arc sensing control is generally used. In the arc sensing control, based on change in the welding current associated with change in the wire extension length when the welding torch is oscillated in the direction of the groove width, the positional correction (moving the center of oscillation in the horizontal and vertical directions) is made in the groove width direction of the welding torch (hereinafter referred to as "the oscillating direction") and the groove vertical direction (hereinafter referred to as "the direction of the torch axis").

The arc phenomenon is very unstable and proceeds at an ultra high speed, and therefore the reliability of the present arc sensing control is limited. In addition, an objective methodology to determine the quality of welding has not been developed yet, and defectively welded products could be unexpectedly marketed at any time. Since the reliability of the present arc sensing control is low and in the fields requiring high quality of arc welding such as high speed welding for a thin steel plate, more complicated and expensive active control systems other than the arc sensing control such as providing a laser displacement sensor at the top of a welding torch for example is inevitable.

Therefore, various methods to improve the reliability of the arc sensing control which is simple and easy have been proposed, but anything satisfactory in practical level has not yet been suggested.

According to the method disclosed by Japanese Patent Publication No. Sho 53-11502 for example, the magnitudes of the integrated value of welding current at prescribed intervals obtained at both ends of weaving (oscillation) are compared each other mainly for adjusting displacement in the groove width direction. The welding torch has then its weaving center position corrected in the transverse direction based on the comparison signal and is made to track the correct weld line.

According to this method, however, the integrated value of welding current at both ends of weaving must be averaged several times in order to improve the positional detection accuracy, the output of the positional excursion correction signal is delayed by a time period corresponding to the number of averaging, and the tracking control accuracy of the welding torch is degraded. If the welding speed is slowed to shorten the weld line proceeding during this wasteful time, the tracking control accuracy certainly improves and yet the production efficiency is downed instead. In addition, in order to prevent the output of the positional excursion correction signal from being delayed without lowering the welding speed, the weaving frequency may be increased. If however the weaving frequency is increased, the weaving frequency is reduced, integrating and averaging the welding current including much disturbance information does not improve the removal ratio of the disturbance information. If the number of averaging is increased, the adverse effect of the disturbance information upon the correction signal may be reduced, but the output of the positional excursion correction signal is delayed for the increase in the number of averaging which would eventually prevent the tracking control accuracy from improving.

The method proposed by Japanese Patent Publication No. Hei 2-4396 is directed to correction of positional excursion from a weld line in weaving welding process. More specifically, there are provided a comparator to identify whether it is in a short-circuit period or in an arc period based on a welding voltage signal for the arc period, a selecting circuit to extract a welding current signal in the process of arc duration by a signal identifying arc duration from the comparator, an integrator to integrate the output signal of the selecting circuit for one cycle or half the cycle of weaving, a counter to count arc period, an average value calculation circuit to output an average value signal produced by averaging the outputs of the integrator by the arc period, and a hold circuit to hold the average value signal at the end of one cycle or half the cycle of weaving. Here the output of the hold circuit and a set value for welding current are compared to determine a positional excursion in the vertical direction, i.e., the direction of the welding torch axis. Furthermore, a positional excursion in the horizontal direction, i.e., the direction perpendicular to the direction of the welding torch axis is further determined based on the polarity of the output of the hold circuit. A positional excursion correction instruction is then output to a correction motor.

According to the method, however, if a set value for welding current is changed during an arc welding, a distance between contact tip and base metal set prior to the start of welding is changed, and arc welding cannot be surely performed.

According to the method proposed by Japanese Patent Publication No. Sho 57-2428, the welding current at both ends of weaving is detected and compared to a prescribed reference value to obtain a signal for positional excursion correction from the weld line.

According to the method, however, the detected welding current contains much disturbance information other than the positional information, and the position detection accuracy can be extremely low in a low current state such as in a short-circuiting transfer state and a globular transfer state. The method is therefore only limitatively applicable in a high current, spray transfer state.

According to the method proposed by Japanese Patent Publication No. Hei 7-4666, assuming that the arc length is fixed regardless of the position of oscillation, the ratio of the integrated values of welding current in the first half and the second half in the regions of the right and left halves of the oscillating width in one cycle of oscillation (first and second comparison signals) are operated. The oscillating center of the welding torch is then moved in the direction in which the difference between these comparison signals is reduced.

By this method, however, extremely unstable waveforms of welding current in a short-circuit period are incorporated as they are into the integrated values of welding current. Therefore, it has been confirmed that even if the welding torch actually normally tracks with no positional excursion in operation, and sputtering is stable, the first and second comparison signals randomly make great leaps. Therefore, if the welding torch is controlled to be moved in the direction in which the difference between the first and second comparison signals is reduced, the welding torch could depart from the weld line on the contrary. Furthermore, the method is only on condition that the arc length is approximately fixed, while in practice the welding wire melting speed sometimes cannot follow changes in the welding current with time by the influence of the inductance of the welding power supply circuit. Thus the welding torch can not be controlled to accurately be moved due to the change of the arc length.

SUMMARY OF THE INVENTION

It is an object of the present invention to provide a tracking monitoring device and a tracking control device for a weld line less affected by a short-circuit mode or sputtering mode which serves as a disturbance factor in a welding current value and capable of coping with a welding speed increase in association with higher speed oscillating frequency.

In order to achieve the above object, the tracking monitoring device for a weld line according to the present invention includes:

(A) welding current detecting means for detecting a welding current waveform obtained when a welding torch is oscillated in a groove width direction, wherein a short-circuit period and arc period are repeated for groove welding in the consumable electrode gas shield arc welding;

(B) short-circuiting current waveform removing means for removing a short-circuiting current waveform from the welding current wave form detected by the welding current detecting means, wherein the short-circuiting current waveform is a welding current waveform in a short-circuit period;

(C) interpolating means for linearly interpolating a missing part in the welding current waveform removed of the short-circuiting current waveform;

(D) sampling means for sampling the linearly interpolated welding current waveform at a plurality of intervals corresponding to the oscillating frequency of the welding torch;

(E) replacing means for replacing the sampled welding current waveforms by an approximated straight line by a least square method or a substantially equivalent method thereto; and (F) oscillating direction positional excursion display means for displaying the positional excursion direction and positional excursion distance of the welding torch in the oscillating direction relative to a groove central position as a reference, wherein the positional excursion direction and positional excursion distance correspond to the inclination direction and inclination angle of the approximated straight line.

The sampling means includes folding and superposing means for sampling a linearly interpolated welding current waveform at a plurality of intervals corresponding to one cycle of oscillation of the welding torch, and folding and superposing the sampled welding current waveforms at a position corresponding to half the cycle of oscillation. When the superposed welding current waveforms are replaced by an approximated straight line by the replacing means, a height at a fixed point corresponding to the central position of the approximated straight line, in other words, a point corresponding to a position of one fourth (90°) to three fourths (270°) of the cycle of the oscillation of the welding torch and a predetermined set value for welding current may be compared to display the difference as the positional excursion direction and positional excursion distance of the welding torch in the direction of the welding torch axis. Note that though rare if a groove center is not particularly taught in the case of different plate thickness welding for example, the position at the fixed point might have to be set other than at a position corresponding to one fourth to three fourths of the cycle of oscillation.

When the welding current waveform is replaced by an approximated straight line by the replacing means, the welding current waveform may be previously converted into a smoothed current waveform using average means according to a moving-average method. Thus, indented waves in the welding current waveform created by sputtering or the like can be eliminated, and disturbance information other than the positional information of the welding torch can be removed as much as possible. At the same time, by setting the waveform sampling cycle to be relatively long at the time of replacement to the approximated straight line, sufficient tracking control accuracy in practice can be maintained as the operation speed is to be further increased.

More specifically, the short-circuiting current waveform removing means includes threshold value setting means for setting a reference welding voltage to differentiate an arc period and a short-circuit period in a welding voltage waveform as a threshold value. However, though for short-circuit period, there still remains a large disturbance factor other than the positional information of the welding torch at a part immediately before the start of a short-circuit period and a part immediately after the start of an arc period, even in a welding voltage region higher than the threshold value or reference welding voltage. Thus, it is preferred that a waveform portion to be cancelled as a short-circuit period is extended backward and forward by the first operation means and the second operation means, and the welding current waveform including the part immediately before the start of a short-circuit period and the part immediately after the start of an arc period is canceled. As a result, the influence of the short-circuit period as a large disturbance factor can be substantially completely removed in monitoring the tracking of the welding torch.

Further, the tracking control device for a weld line includes:

(A) welding current detecting means for detecting a welding current waveform obtained when a welding torch is oscillated in a groove width direction, wherein a short-circuit period and arc period are repeated for groove welding in the consumable electrode gas shield arc welding;

(B) short-circuiting current wave form removing means for removing a short-circuiting current waveform from the welding current waveform detected by the current detecting means, wherein the short-circuiting current waveform is a welding current waveform in a short-circuit period;

(C) interpolation means for linearly interpolating a missing part of the welding current waveform removed of the short-circuiting current waveform;

(D) sampling means for sampling the linearly interpolated welding current waveform at a plurality of intervals corresponding to the oscillating frequency of the welding torch;

(E) replacing means for replacing the sampled welding current waveforms by an approximated straight line by a least square method or a substantially equivalent method thereto;

(F) oscillating direction excursion operation means for performing operation to obtain the positional excursion direction and positional excursion distance of the welding torch in the oscillating direction relative to a groove central position as a reference, wherein the positional excursion direction and positional excursion distance correspond to the inclination direction and inclination angle of the approximated straight line; and (G) the direction of the welding torch axis positional excursion operation means for comparing a height at a fixed point on the approximated straight line corresponding to one fourth and three fourths of the oscillating frequency of the welding torch to a set value for welding current, thereby performing operation to obtain the positional excursion direction and positional excursion distance of the welding torch in the direction of the welding torch axis, and (H) based on the operation results of the oscillating direction positional excursion operation means and the direction of the welding torch axis positional excursion operation means, the oscillating center of the welding torch and the height of the torch are controlled to move in a direction to cancel the oscillating positional excursion direction and the positional excursion distance of the direction of the welding torch axis. Similarly to the tracking monitoring device described above, the averaging means and folding and superposing means can be applied to this tracking control device.

DESCRIPTION OF THE PREFERRED EMBODIMENTS

Figure 1:
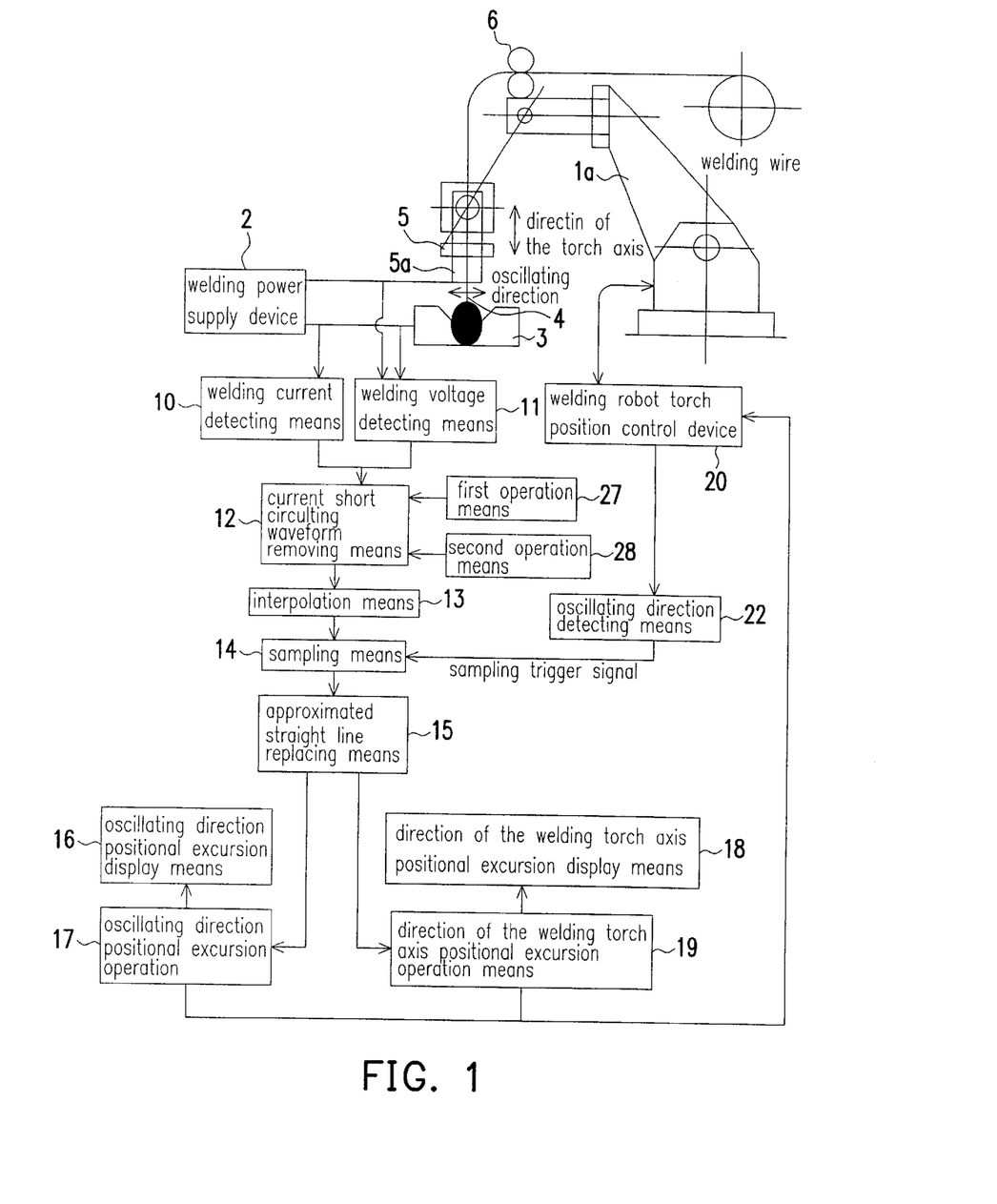
FIG. 1 is a schematic block diagram of a tracking control device for a weld line according to one embodiment of the present invention.

A preferred embodiment of the present invention will be now described in conjunction with the accompanying drawings. FIG. 1 is a schematic block diagram of a tracking control device including a tracking monitoring device for a weld line according to one embodiment of the present invention. When there is no feedback from oscillating direction positional excursion operation means 17 and the direction of the welding torch axis positional excursion operation means 19 to a welding robot torch position control device 20, the device functions as a simple tracking determining device. In FIG. 1, the reference numeral 1 designates a consumable electrode gas shielded arc welding device (hereinafter simply as the "arc welding device") including a welding robot 1a, 2a welding power supply device, 3a base metal having a groove welding portion, and 4a welding wire serving as a welding electrode. The supply side of the welding wire 4 is wound into a coil, and the contact tip end of the welding wire 4 let out at a prescribed speed from the supply side of the coil through a feed roller 6 is supplied toward the base metal 3 as it is held by a contact tip 5a of the welding torch 5.

Reference numeral 10 represents welding current detecting means, and 11 represents welding voltage detecting means. These detecting means 10 and 11 detect welding current and welding voltage supplied from the welding power supply device 2 to the base metal 3 and the welding wire 4, respectively. In FIG. 1, there are also short-circuiting current waveform removing means 12, interpolation means 13, sampling means 14, approximated straight line replacing means 15, oscillating direction positional excursion display means 16, oscillating direction positional excursion operation means 17, the positional excursion direction of the welding torch axis display means 18, the positional excursion direction of the welding torch axis operation means 19, a welding robot torch position control device 20, and oscillating direction detecting means 22. Each block will be further described.

Figure 2:
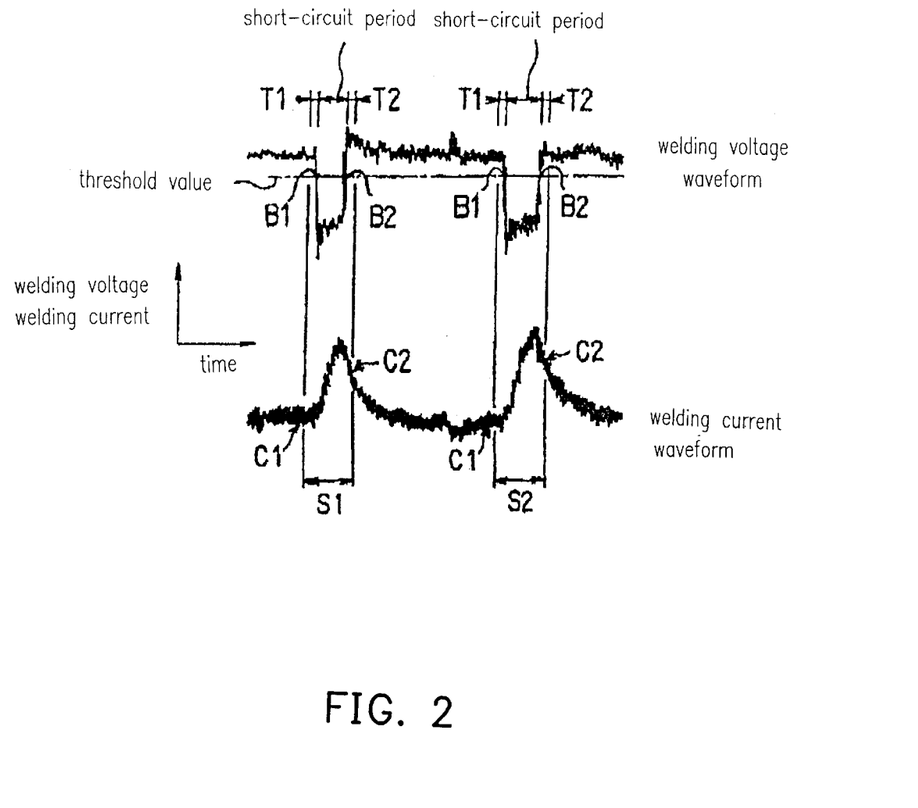
FIG. 2 is a waveform chart of welding voltage/current for a welding torch.

The welding power supply device 2 is a high speed control type device having its output controlled using an inverter type, and can control the waveforms of the welding current and the welding voltage. The welding current detecting means 10 is connected to the base metal 3 to detect the welding current, and the welding voltage detecting means 11 is connected to the welding wire 4 and the base metal 3 to detect the welding voltage. FIG. 2 shows an example of the welding voltage and current waveforms detected by these detecting means.

The short-circuiting current waveform removing means 12 removes waveforms S1 and S2 in short-circuit periods from the welding current waveform shown in FIG. 2. More specifically, a reference voltage for differentiating between the arc period and short-circuit period is set in the welding voltage waveform as a threshold value by threshold value setting means. Then, the welding current wave form corresponding to the voltage portion lower than the threshold value is basically removed as a short-circuit period. The technique of thus removing the welding current waveform in the short-circuit period has been partly proposed in a conventional technique for example by Japanese Patent Publication No. Hei 2-4396 in connection with the use of a comparator. Note however that such manner of differentiating by setting the threshold value at the boundary still causes a great disturbance factor other than the welding torch positional information of the welding torch to remain at the portion immediately before the start of a short-circuit period and the portion immediately after the start of an arc period though only for a short-circuit period. Therefore, according to the invention, in addition to the short-circuiting current wave form differentiated with the threshold value as shown in FIG. 2, the waveform portions corresponding to the extension portions before and after the current waveform for prescribed time periods T1 and T2 are also removed as a short-circuiting current waveform portion. More specifically, there is provided first operation means 27 to perform operation to obtain a position in the welding current waveform corresponding to a point the prescribed time period T1 before the reaching point B1 at which the threshold value in the welding current waveform is reached as a starting point C1 for removing a short-circuiting current waveform (see FIG. 1). There is also provided second operation means 28 to perform operation to obtain a position in the welding current waveform corresponding to a point the prescribed time period T2 after the departing point B2 which departs from the threshold value in the welding voltage waveform as an end point C2 for removing the short-circuiting current waveform (see FIG. 1). More specifically, these first and second operation means 27 and 28 are expressed as time steps in an operation program. Based on the operation results of the first and second operation means 27 and 28, the welding current waveform between the starting point C1 and the end point C2 for removing the short-circuit waveform is cancelled by the waveform canceling means. The waveform canceling means is expressed as a waveform memory clearing step in the operation program.

The preceding time period T1 and succeeding time period T2 are for example set to 1 msec and 5 msec, respectively. However, the optimum values for the time periods differ depending upon the welding conditions and the level of the threshold value, and the values are set in view of specific conditions. The welding current waveform immediately after the start of an arc is generally less stable than that immediately before the start of a short-circuit, and therefore the succeeding time period T2 may be generally set longer than the preceding time period T1.

Figure 3A:
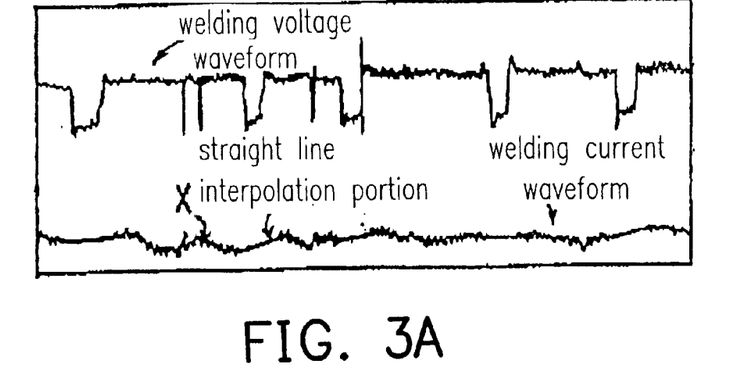
FIG. 3A is a welding voltage/current wave form chart showing a linearly interpolated welding current waveform.

The interpolation means 13 linearly interpolates a missing part of a waveform generated by the above-described removal of short-circuiting current waveform. The starting point C1 and the end point C2 for removing the short-circuiting current waveform in FIG. 2 are connected by a straight line (see the straight line part of the lower side waveform X in FIG. 3A). The linear interpolation is performed to improve the operation accuracy in operations to obtain an oscillating direction positional excursion or the direction of the welding torch axis positional excursion distance in the succeeding steps. The welding current in a short-circuit period completely disregarded in the conventional technique of extracting only the welding current signal during an arc period by the selecting circuit as disclosed by Japanese Patent Publication No. Hei 2-4396 is replaced with a linear welding current waveform free from noises. As a result, the behavior of actual arc welding is reflected upon the operation of the oscillating direction positional excursion or the direction of the welding torch axis positional excursion as much as possible. The moving average and approximated straight line replacement in the succeeding steps can be effective only with this linear interpolation.

Figure 3B:
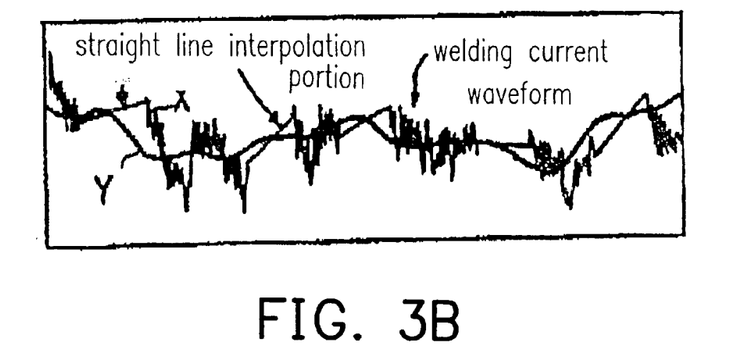
FIG. 3B is a chart showing a linearly interpolated welding current waveform and a moving average curve thereof.

The sampling means 14 samples the linearly interpolated welding current waveform at a plurality of substantially equal intervals corresponding to the oscillating frequency of the welding torch. For example, the waveform X in FIG. 3B is sampled at intervals of one cycle of oscillation. Herein, "substantially equal" suggests that strictly speaking, the time intervals between oscillation end points are not necessarily fixed. More specifically, the sampling means 14 is controlled by an oscillated synchronizing pulse output representing an oscillating end point in a welding robot system. According to the present embodiment, the waveform X in FIG. 3B is converted into the waveform Y in FIG. 3B by moving average employed as averaging means, and then the waveform Y is divided at each cycle of oscillation. Note that after the waveform X is divided for each cycle of oscillation, the divisional parts may be subjected to moving average to obtain divided waveform Y. The interval of sampling is conveniently set as one cycle of oscillation in connection with folding and superposing means which will be described later, but the waveform may be sampled for each of half the cycle of oscillation without using the folding and superposing means.

The sampling timing is applied by a sampling trigger signal from oscillating direction detecting means 22. The oscillated synchronizing pulse signal per se may be basically used as the sampling trigger signal. However, if the time delay between the oscillated synchronizing pulse signal and an actual welding torch oscillating end point is relatively large, the time delay is previously detected and the sampling timing of the welding current waveform by the sampling means is preferably set delayed from the oscillated synchronizing pulse signal by the time delay. Note that the actual welding torch oscillating end point is measured by a laser displacement sensor attached to the welding torch for example, and the time delay is calculated by simultaneously measuring the oscillated synchronizing pulse signal and the end point by a laser displacement sensor output. Since the time delay is subtly different for each welding robot, each robot is detected for time delay before the welding operation.

Figure 3C:
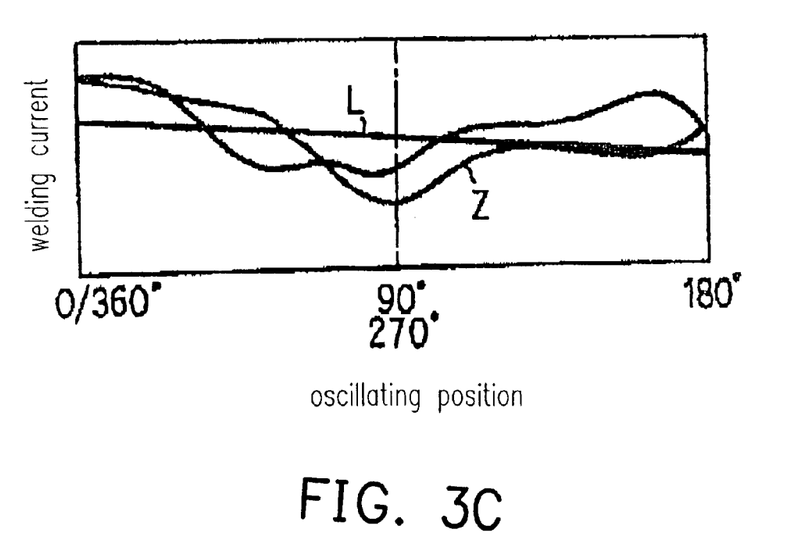
FIG. 3C is a chart showing a moving average curve of one cycle of oscillation fold and superposed at a half-cycle position.

The folding and superposing means folds the waveform for one cycle of oscillation smoothed by moving average at a half-cycle position (180°) for superposing as shown in FIG. 3C. The folding and superposing means folds the waveform for one cycle of oscillation at the half-cycle position in the center and superposes waveforms each for one cycle of oscillation with one another to make it possible to express the characteristic of the welding current waveform for one cycle of oscillation by the inclination and height of one straight line in the following approximated straight line replacement step. Note that if the welding current waveform is sampled for every half cycle of oscillation as described above, such folding and superposing means is not necessary. Thus, the going path (to the right) and the return path (to the left) of the curve Z in FIG. 3C are each independently subjected to approximated straight line replacement in the following step.

The approximated straight line replacing means 15 replaces sampled welding current waveforms by an approximated straight line by a least square method or a method substantially equivalent thereto. As a result, the information related to the oscillating direction positional excursion and the direction of the welding torch axis positional excursion distance can be calculated virtually in real time.

More specifically, according to the conventional method of the averaging integrated values of welding current waveforms, a relatively long sampling time period for averaging is necessary. Therefore, information related to the behavior of arc welding can hardly be extracted in real time. Furthermore, in the integrated value averaging method, two kinds of information, the oscillating direction positional excursion information and the direction of the welding torch axis positional excursion information are included in mixture. Therefore, it is impossible to display both positional excursions or control correction of the positional excursions based on both kinds of positional excursion information while strictly separating them.

In contrast, according to the present invention, the welding current waveform for one cycle of oscillation is expressed by the inclination and height of one approximated straight line, the oscillating direction positional excursion information can be derived from the inclination angle and direction of the approximated straight line. Meanwhile, the direction of the welding torch axis positional excursion information can be derived from the height of the approximated straight line. Note that the approximated straight line is derived from a welding current waveform smoothed by moving average processing according to this embodiment, while the tracking monitoring accuracy and control accuracy are not lowered if the approximated straight line is directly derived from the original current waveform without moving averaging processing.

Figure 5:
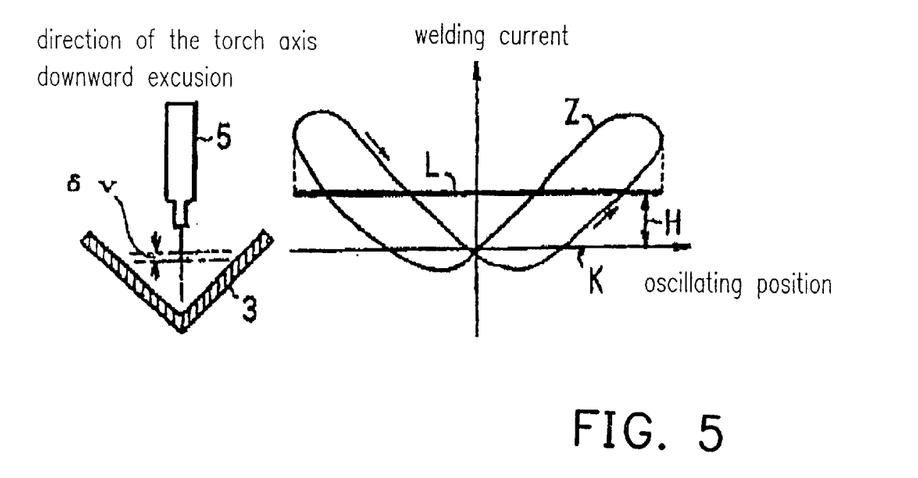
FIG. 5 shows a model screen image of a tracking display device when there is a downward positional excursion in the direction of the welding torch axis.
Figure 6:
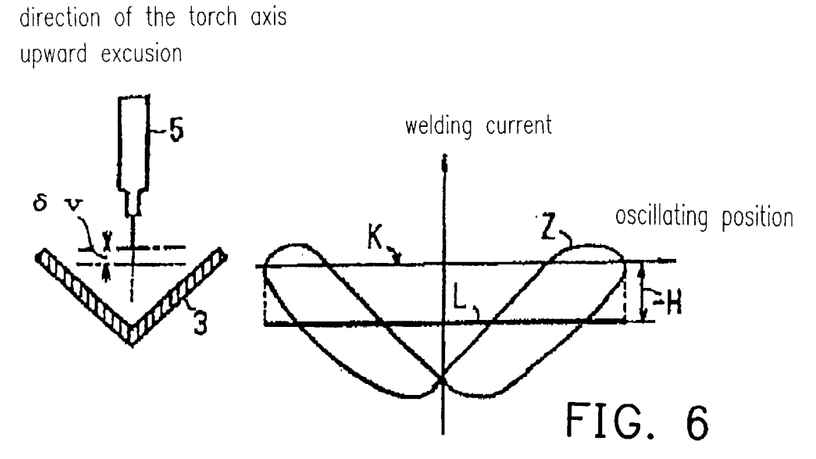
FIG. 6 shows a model screen image of a tracking display device when there is an upward positional excursion in the direction of the welding torch axis.
Figure 7:
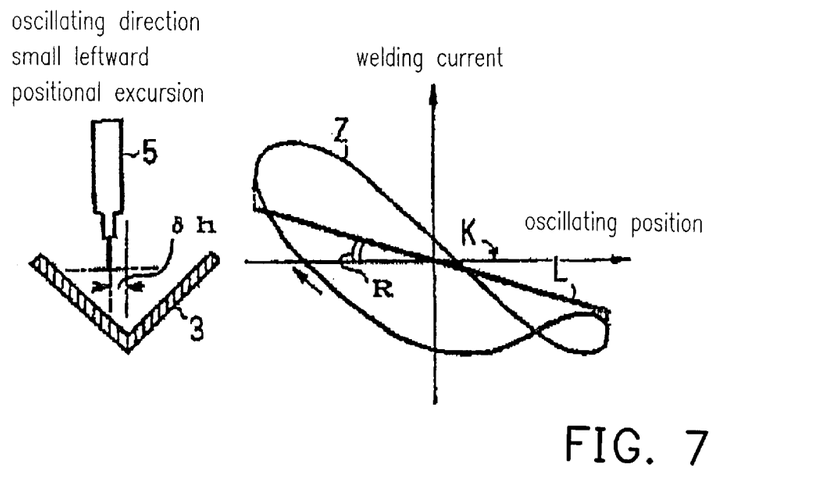
FIG. 7 shows a model screen image of a tracking display device when there is a small leftward positional excursion in the oscillating direction.
Figure 8:
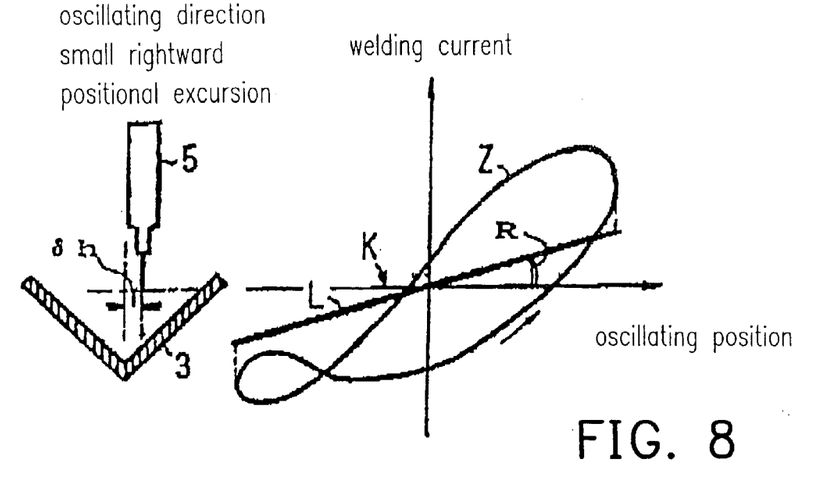
FIG. 8 shows a model screen image of a tracking display device when there is a small rightward positional excursion in the oscillating direction.
Figure 9:
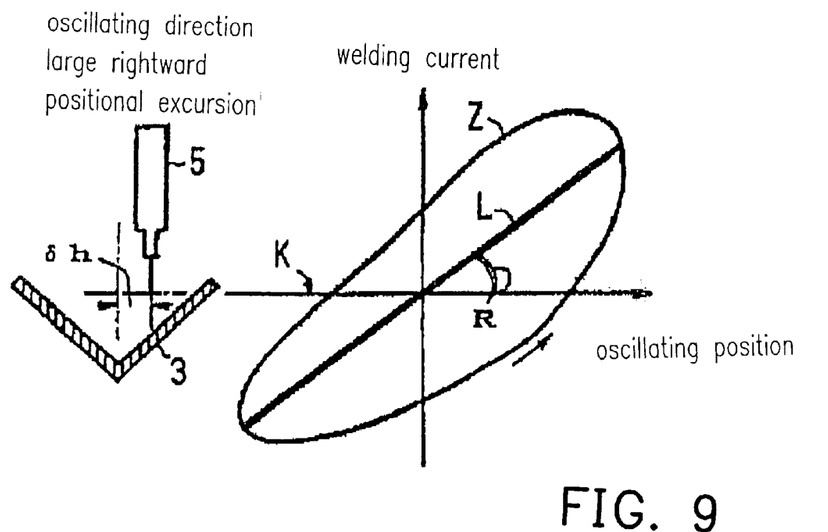
FIG. 9 shows a model screen image of a tracking display device when there is a large rightward positional excursion in the oscillating direction.

The oscillating direction positional excursion display means 16 and the torch axis positional excursion display means 18 are typically a CRT screen or a liquid crystal display screen to display images as shown in the left part of FIGS. 4 to 9. However, display means to give analog or digital indication of the oscillating direction positional excursion distance and the direction of the welding torch axis positional excursion distance or their changes with time maybe employed. The images are displayed based on the operation results of the oscillating direction positional excursion operation means 17 and the torch axis positional excursion operation means 19. The operation contents of both operation means 17 and 19 will be described as follows by referring to waveforms in the right part of FIGS. 4 to 9. Note that the waveform in the right part in each figure is formed by folding and superposing a welding current waveform for one cycle of oscillation at a half cycle point and the vertical line corresponds to one fourth to three fourths of the cycle of oscillation. The thick horizontal line L in FIGS. 4 to 6 and the thick inclined line L in FIGS. 7 to 9 are both approximated straight lines L obtained from the waveforms in these figures by the least square method. Note, however, that the waveform itself is created for the convenience sake in view of decrease/increase in the welding current value depending upon the altitude between the welding torch 5 and the base metal 3 rather than a real waveform shown in FIG. 3C.

Figure 4:
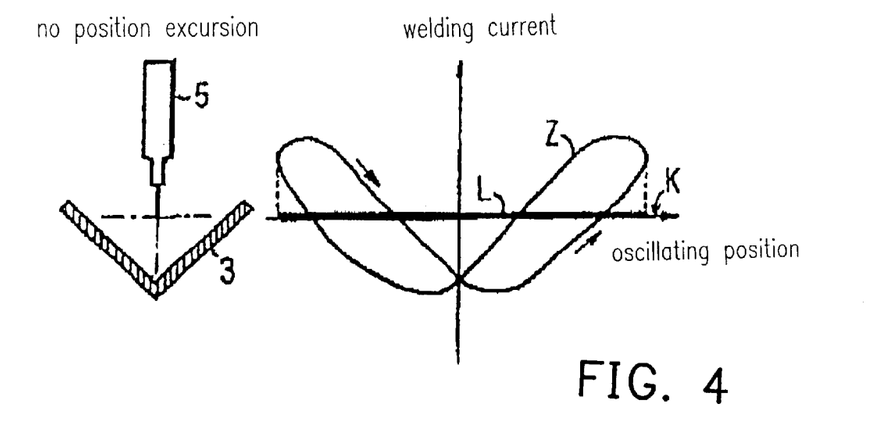
FIG. 4 shows a model screen image of a tracking display device when there is no tracking positional excursion.

First, the waveform in FIG. 4 represents a normal welding state in which the oscillating direction positional excursion and the direction of the welding torch axis positional excursion are both zero. At this time, the inclination of the approximated straight line L is zero (level), while the central height of the approximated straight line L is in coincidence with a reference height (set welding current value). FIG. 5 shows the state in which there is the direction of the welding torch axis positional excursions lightly downward from the correct welding state in FIG. 4. At this time, the welding current increases in inverse proportion to decrease in the altitude between the welding torch 5 and the base metal 3, so that the approximated straight line L moves upward still with the inclination of zero. Therefore, at the height H (operation welding current value) of the approximated straight line L from a reference height K at a position corresponding to one fourth to three fourths of the oscillating frequency may be used to express the direction of the welding torch axis positional excursion $\delta V = -\alpha H$ ($\alpha$: a proportional constant set based on experimental data).

FIG. 6 shows the state in which there is the direction of the welding torch axis positional excursion slightly upward from the normal welding state in FIG. 4. At this time, the welding current decreases in inverse proportion to increase in the altitude between the welding torch 5 and the base metal 3, and therefore the approximated straight line L moves downward still with the inclination of zero. Similarly, the height (−H) of the approximated straight line L from the reference height K corresponding to one fourth to three fourths of the cycle of oscillation can be used to represent the direction of the welding torch axis positional excursion $\delta V = \alpha H$.

FIG. 7 shows the state in which there is an oscillating direction positional excursion slightly leftward from the groove center. At this time, the altitude between the welding torch 5 and the base material 3 decreases on the left side of the oscillation center, the waveform Z becomes dissymmetry with greater current on the left side and therefore the approximated straight line L inclines in the upper left direction. FIG. 8 shows the state in which there is an oscillating direction positional excursion slightly rightward from the groove center. At this time, since the altitude between the welding torch 5 and the base metal 3 decreases on the right side of the center of oscillation, the waveform Z becomes dissymmetry with greater current on the right side and the approximated straight line inclines in the upper right direction. FIG. 9 shows the state in which there is an oscillating direction positional excursion greatly rightward from the groove center. At this time, the altitude between the welding torch 5 and the base metal 3 greatly decreases on the right side of the oscillating center, the waveform Z becomes dissymmetry with greater current on the right side, and the approximated straight line greatly inclines in the upper right direction. Thus, the direction and amount of the oscillating direction positional excursion are reflected on the direction and angle of inclination of the approximated straight line, and therefore the oscillating direction positional excursion can be represented as $\delta h = \beta R$ (where $\beta$ is a proportional constant set based on experimental data and R is the inclination angle). If the inclination in the lower right direction is "minus", the inclination in the upper right direction is "plus" and the proportional constant $\beta$ is positive, the minus represents a leftward positional excursion, and the plus represents a rightward positional excursion. The oscillating direction positional excursion operation means 17 and the direction of the welding torch axis positional excursion operation means 19 perform operation to obtain the oscillating direction positional excursion amount $\delta h$ and the direction of the welding torch axis positional excursion $\delta v$ based on the inclination angle of the approximated straight line and the height corresponding to one fourth to three fourths of the cycle of oscillation as described above.

The oscillating direction detecting means 22 basically uses a synchronizing pulse signal for oscillating direction instruction from the welding robot torch position control device 20 as it is. However, there exists a subtle response delay characteristic in practice between the synchronizing pulse signal described above and the operation of the welding robot. In order to reflect the response delay characteristic on the sampling timing by the sampling means 14, a displacement sensor is provisionally provided at the top of the welding torch 5, actual time delay after the rising of a synchronizing pulse signal for oscillating direction instruction until the detection of the oscillating end point by the displacement sensor is actually measured. Then, a separate pulse signal delayed for this time delay from the synchronizing pulse signal for oscillating direction instruction is used as a sampling trigger signal for the sampling means 14. The sampling trigger signal provides a sampling timing for sampling a welding current waveform corresponding to the oscillating frequency by the sampling means 14 described above. Sampling is started when the n-th synchronizing pulse (ON) is detected using the synchronizing pulse signal of the oscillating direction detection means 22 as a reference, while the sampling for the next one cycle is completed when the n+1-th synchronizing pulse signal (ON) is detected, and the sampling for the next cycle is started at a time. Note that when the synchronizing pulse signal attains an ON state, the welding torch 5 starts an oscillating stroke from one end to the other end. When the synchronizing pulse signal attains an OFF state, the welding torch 5 starts an oscillating stroke in the opposite direction, i.e., from the other end to the one end.

The operation of the tracking control device will be now described. First, basic conditions such as the oscillating frequency, the oscillating width, the position of the welding torch height are input to the welding robot torch position control device 20 of the welding robot 1a. The welding robot 1a starts welding in response to a received start signal, and performs arc welding while the welding torch 5 aims at a plurality of prescribed taught points provided along the groove weld line of the base metal 3.

The welding robot torch position control device 20 controls the torch position of the welding robot 1a so that the oscillating center of welding torch 5 tracks the weld line. More specifically, as long as the weld line is correctly tracked by appropriate welding current, the horizontal approximated straight line at an appropriate height is displayed as shown in FIG. 4. If however the welding torch 5 is shifted in the direction of the welding torch axis for example, a position in the approximated straight line corresponding to one fourth to three fourths of the cycle of oscillating positional excursions upward and downward as shown in FIGS. 5 and 6. Then, in order to cancel the positional excursion and return the approximated straight line to the original height, a signal from the direction of the welding torch axis positional excursion operation means 19 is input to the welding robot torch position control device 20. More specifically, in the welding robot torch position control device 20, if the current value of the approximated straight line at a position corresponding to one fourth to three fourths of the cycle of oscillation (the height of the approximated straight line L at the central position in FIGS. 4 to 9) is higher than the initially set current value, the welding torch is controlled to be raised so that the difference there between can be reduced. Conversely, if the welding current value is lower than the initially set value for welding current, the welding torch is controlled to be lowered.

If the oscillating center is shifted from the weld line in the horizontal direction, as shown in FIGS. 7 to 9, the approximated straight line inclines in the upper left or upper right direction. In order to cancel the inclination and return the approximated straight line to the original horizontal state, a signal from the oscillating direction positional excursion operation means 17 is input to the welding robot torch position control device 20.

In actual control, the direction of the welding torch axis control and the oscillating direction control are combined. Thus, the welding torch 5 is moved in the vertical and horizontal directions by the welding robot 1a, the oscillating center of the welding wire 4 is controlled to track the weld line, and the welding current is controlled to take a prescribed value. Thus, based on positional excursion distance data obtained by the operations by the oscillating direction positional excursion operation means 17 and the direction of the welding torch axis positional excursion operation means 19, a correction instruction is issued to the welding robot torch position control device 20 in order to nullify the positional excursion. As a result, the position of the welding torch 5 (the position of oscillating center and the welding torch height) is corrected.

Note that a correction instruction is output to the welding robot torch position control device 20 based on the operation values of the oscillating direction positional excursion operation means 17 and the direction of the welding torch axis positional excursion operation means 19. The output values and the corrected operation values of the operation means 17 and 19 are held and accumulated. If their relative relation is learned by artificial intelligence, an optimum correction instruction value may be instantaneously output thereafter in other applications.

One embodiment of the present invention has been described, but the present invention may be subjected to various modifications other than this embodiment. For example, the moving average method is employed in this embodiment in order to allow the welding current to have a smoothed waveform, methods other than the moving average or a method substantially identical to the moving average to smooth a waveform may be employed. In addition, the approximated straight line is obtained according to the least square method in this embodiment, a similar approximated straight line may be obtained according to a method substantially identical method to the least square method. The tracking monitoring device according to the present invention may be implemented in an embodiment without the direction of the welding torch axis positional excursion display means other than the embodiment in which the oscillating direction positional excursion display means and the direction of the welding torch axis positional excursion display means are both provided.

Using the tracking monitoring device and the tracking control device according to the present invention, the oscillating direction positional excursion distance and the direction of the welding torch axis positional excursion distance for each cycle of oscillation of the welding torch are available based on the inclination angle and height of the approximated straight line substantially in real time. Therefore, as compared to the conventional tracking monitor or tracking control by averaging the integrated values of the welding current waveforms, there is very small time delay in the arc sensing control. Thus the tracking monitoring accuracy or the welding torch tracking control accuracy can be significantly improved in proportion to the oscillating frequency. Therefore, in the tracking monitoring device, the degree of the tracking positional excursion can be accurately monitored in real time, so that products defective in welding quality because of the tracking positional excursion can be surely prevented from being marketed. Furthermore, in the tracking control device, the tracking positional excursion can be instantaneously corrected and the manufacture of products defective in the welding quality per se can be prevented.

In addition, welding current stable only in an arc period and the oscillating position can be detected at a time. The first and second operation means can remove the welding current including disturbance information including a portion immediately before the start of a short-circuit period and a portion immediately after the start of an arc period. Furthermore, the welding current in unstable welding such as in arc discontinuity can be removed, so that the disturbance information except for the welding torch positional information generated in the welding current detection can be removed as much as possible. Thus, without dependence upon the welding conditions, the arc positional excursion from the weld line can be detected with high accuracy. The welding quality can be improved and the man-hours involved in correction after the welding can be reduced.

Furthermore, if the aiming angle of the welding torch changes under the arc sensing control, high accuracy tracking control for a weld line is enabled, and the man-hours necessary for the operation of teaching the welding robot can be reduced accordingly. Some variations in the precision of parts or variations in connection with jigs do not affect the control of the welding torch at all. Therefore, the yield can be improved by lowering the part precision management standard and jigs can be simplified to reduce the cost.

In addition, since the positional excursion is directly detected from the welding portion by the arc sensing control, the conventional, well-known groove tracking device is not necessary. Various sensors which could be an obstacle in the way of welding is not attached to the welding torch, so that the flexibility of the working position can be improved, and high reliability can be provided in bad environments in association with sputtering, fume, arc heat or the like. As a result, the detection accuracy and durability can be prevented from being lowered.

While there has been described what are at present considered to be preferred embodiments of the invention, it will be understood that various modifications may be made thereto, and it is intended that the appended claims cover all such modification as fall within the true spirit and scope of the invention.

What is claimed is:

1. A tracking monitoring device for a weld line, comprising:
   (A) welding current detecting means for detecting a welding current waveform obtained when a welding torch is oscillated in a groove width direction, in consumable electrode gas shield arc welding, a short-circuit period and arc period being repeated for groove welding;
   (B) short-circuiting current waveform removing means for removing a short-circuiting current waveform from the welding current wave form detected by said welding current detecting means, said short-circuiting current waveform being a welding current waveform in a short-circuit period;
   (C) interpolating means for linearly interpolating a missing part in the welding current waveform removed of the short-circuiting current waveform;
   (D) sampling means for sampling said linearly interpolated welding current waveform at a plurality of intervals corresponding to the oscillating frequency of the welding torch;
   (E) replacing means for replacing said sampled welding current waveforms by an approximated straight line by a least square method; and
   (F) excursion display means in an oscillation direction for displaying the positional excursion direction and positional excursion distance of the welding torch in the oscillating direction relative to a groove central position as a reference, said positional excursion direction and positional excursion distance corresponding to inclination direction and inclination angle of said approximated straight line.

2. The tracking monitoring device for a weld line according to claim 1, further comprising averaging means for obtaining a moving average of said linearly interpolated welding current waveform, thereby converting said waveform into a smoothed current waveform.

3. The tracking monitoring device for a weld line according to claim 2, further comprising direction of the welding torch axis excursion display means for displaying the excursion direction and excursion distance of the direction of the welding torch axis by comparing a height at a fixed point on said approximated straight line corresponding to one fourth and three fourths of the cycle of oscillation of the welding torch and a set welding current value.

4. The tracking monitoring device for a weld line according to claim 1, wherein
   said short-circuiting current waveform removing means comprises:
   threshold setting means for setting a reference voltage for differentiating an arc period and a short-circuit period in a welding voltage waveform as a threshold value;
   first operation means for performing operation to obtain a position in the welding current waveform corresponding to a point a prescribed time period before a reaching point at which said reference voltage is reached in the welding voltage waveform as a starting point for removing a short-circuiting current waveform;
   second operation means for performing operation to obtain a position in the welding current waveform corresponding to a point a prescribed time period after a departing point departed from said reference voltage in the welding voltage waveform as an end point for removing the short-circuiting current waveform; and
   waveform canceling means for canceling a welding current waveform between the starting point and end point for removing the short-circuiting current waveform based on the operation results of said first and second operation means.

5. The tracking monitoring device for a weld line according to claim 1, wherein
   said sampling means includes folding and superposing means for sampling an linearly interpolated welding current waveform at a plurality of intervals corresponding to one cycle of oscillation of a welding torch, and folding and superposing the sampled welding current waveforms at a position corresponding to half the cycle of oscillation, the superposed welding current waveforms being replaced by one approximated straight line by said replacing means.

6. The tracking monitoring device for a weld line according to claim 1, wherein
   time delay between an oscillated synchronizing pulse signal and an actual welding torch oscillation end point is previously detected, and a sampling timing of the welding current waveform by said sampling means is set to be delayed by the time delay from the oscillated synchronizing pulse signal.

7. A tracking control device for a weld line, comprising:
   (A) welding current detecting means for detecting a welding current waveform obtained when a welding torch is oscillated in a groove width direction, in consumable electrode gas shield arc welding, a short-circuit period and arc period being repeated for groove welding;

(B) short-circuiting current waveform removing means for removing a short-circuiting current waveform from a welding current waveform detected by said welding current detecting means, said short-circuiting current waveform being a welding current waveform in a short-circuit period;

(C) interpolation means for linearly interpolating a missing part of the welding current waveform removed of the short-circuiting current waveform;

(D) sampling means for sampling said linearly interpolated welding current waveform at a plurality of intervals corresponding to the oscillating frequency of the welding torch;

(E) replacing means for replacing said sampled welding current waveforms by an approximated straight line by a least square method;

(F) oscillating direction positional excursion operation means for performing operation to obtain the positional excursion direction and positional excursion distance of the welding torch in the oscillating direction relative to a groove central position as a reference, said positional excursion direction and positional excursion distance corresponding to the inclination direction and inclination angle of said approximated straight line; and (G) direction of the welding torch axis positional excursion operation means for comparing a height at a fixed point on said approximated straight line corresponding to one fourth and three fourths of the oscillating frequency of the welding torch to a set welding current value, thereby performing operation to obtain the positional excursion direction and positional excursion distance of the welding torch in the direction of the welding torch axis, (H) based on the operation results of said oscillating direction positional excursion operation means and the direction of the welding torch axis positional excursion operation means, the oscillating center of said welding torch and torch height being controlled to move in a direction to cancel said oscillating direction positional excursion and the direction of the welding torch axis positional excursion.

8. The tracking control device for a weld line according to claim 7, further comprising average means for obtaining a moving average of said linearly interpolated welding current waveform, thereby converting the waveform into a smoothed current waveform.

9. The tracking control device for a weld line according to claim 7, wherein said short-circuiting current waveform removing means comprises:

threshold value setting means for setting a reference voltage to differentiate an arc period and a short-circuit period in a welding voltage waveform as a threshold value;

first operation means for performing operation to obtain a position in a welding current waveform corresponding to a point a prescribed time period before a reaching point at which said reference voltage in the welding voltage waveform is reached as a starting point for removing a short-circuiting current waveform;

second operation means for performing operation to obtain a position in the welding current waveform corresponding to a point a prescribed time period after a departing point departed from said reference voltage in the welding voltage waveform as an end point for removing the short-circuiting current waveform; and waveform canceling means for canceling a current waveform between the starting point and the end point for removing the short-circuiting current wave form based on the operation results of said first and second operation means.

10. The tracking control device for a weld line according to claim 7, wherein said sampling means includes folding and superposing means for sampling a linearly interpolated welding current waveform at a plurality of intervals corresponding to one cycle of oscillation of the welding torch and folding and superposing the sampled welding current waveforms at a position corresponding to half the cycle of oscillation, said superposed welding current waveforms being replaced by one approximated straight line by said replacing means.

11. The tracking control device for a weld line according to claim 7, wherein time delay between an oscillated synchronizing pulse signal and an actual welding torch oscillation end point is previously detected, and a sampling timing of the welding current waveform by said sampling means is set to be delayed by the time delay from the oscillated synchronizing pulse signal.

* * * * *